July 8, 1958 J. V. YEOMAN 2,842,197
ADJUSTABLE CAR SUN VISOR
Filed Oct. 21, 1954

INVENTOR.
JOSEPH VICTOR YEOMAN
BY Chas. Krasso
Attorney of the mechanism shown in Figure 3 which will be described further on in the specification.

United States Patent Office 2,842,197
Patented July 8, 1958

2,842,197

ADJUSTABLE CAR SUN VISOR

Joseph Victor Yeoman, Windsor, Ontario, Canada

Application October 21, 1954, Serial No. 463,671

1 Claim. (Cl. 160—224)

This invention relates to sun visors attached to cars above the front wind shield for the purpose of providing shade to drivers on bright sunny days or under any other glare conditions.

Car visors as they exist today cover the entire length of the wind shield and are wide enough to provide sufficient shade under average conditions, for the average driver. However, occasionally drivers find that the standardized visor provides either too much shade or not enough of it, and also obstructs the view of objects above the car roof level, such as traffic lights, signs, street names, etc. Although these visors are detachable from the car, it would be impractical to remove the visor and attach it again every time the occasion called for it.

It is therefore the object of this invention to provide a car visor having an adjustable width so that it can be varied to suit existing or changing light conditions, glare, or the requirements of the individual driver, said width adjustment to be accomplished easily, rapidly, and while the car is at rest or in motion.

The above object is accomplished in the invention by the use of a sectional visor with means for contracting or expanding the said sections.

In describing the invention reference will be made to the attached drawings in which.

Figure 1:
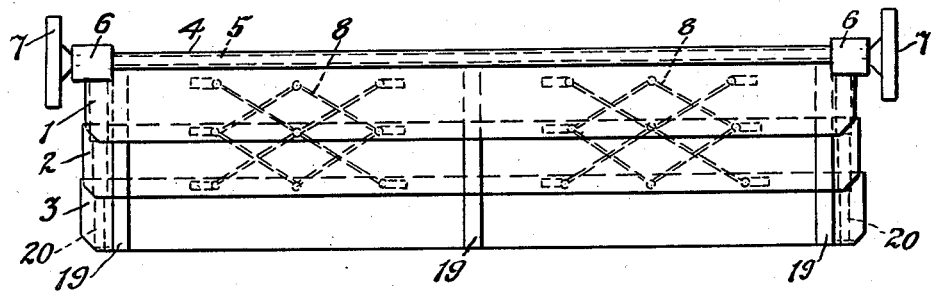
Figure 1 is a plan of the invention with some of the details omitted.
Figure 2:
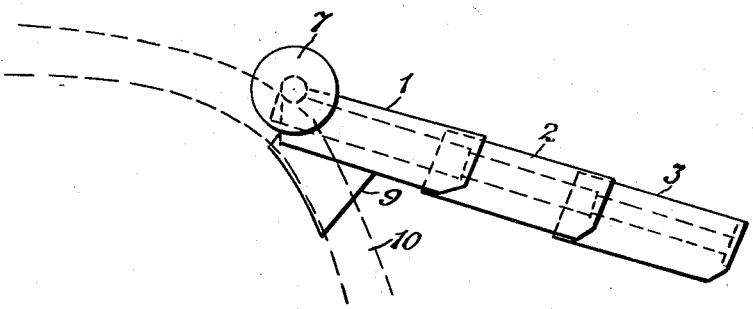
Figure 2 is an elevation of the invention with some of the detail omitted.

In the drawings is shown an adjustable sun visor for a car, consisting of three telescopic sections 1, 2, and 3. Section 1 has a tubular back 4 inside of which is a shaft 5 which goes through a housing 6 at each end of the section 1 and terminates in a round knob 7 which is turned in either direction by the driver of the car to which the said visor is attached. The turning of the knob 7 contracts or expands the width of the visor to provide the exact amount of shade required, by means of the mechanism shown in Figure 3 which will be described further on in the specification.

Figure 4:
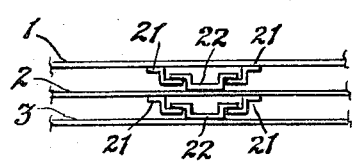
Figure 4 is a detail of the guiding means for the visor sections.

To provide uniform expansion and contraction to the sections of the visor and also to bind them together, the said visor is provided with a plurality of pantograph type arms 8, 8, and guides 19, 19, and 19. A diagram of the said guides is shown in Figure 4. A pair of tracks 21, 21, is attached to the underside of the visor section 1 and the visor section 2; a single track 22 is attached to the upper face of the visor section 2 and visor section 3. The tracks 22 slide within the tracks 21, 21, as shown in Figure 4.

The visor is attached to any standard type of car by means of a suitable bracket 9 which clamps on to the roof top or window post 10 of the car, in the usual manner.

Figure 3:
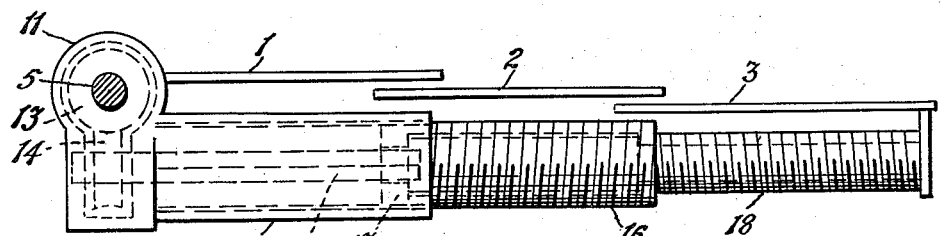
Figure 3 is an elevation of the contraction and expansion mechanism.

The operating mechanism outlined by 20, 20, in Figure 1, is shown in detail in Figure 3. The housing 6 has one part 11 made up of two partly tubular sections at right angles to each other. From the lower part of the section 11 extends a relatively long tube 12 which is tapped inside with a suitable quick travel thread. Attached to the shaft 5 and inside of the housing 11 is a helical gear 13 which is mated with a similar gear 14 at right angles to it, and to the gear 14 is fixed a shaft 15 which is rectangular in cross-section.

A tube 16 is threaded both outside and inside, so that the outside thread fits the thread on the inside of the tube 12, thus the tube 16 screws in and out of the tube 12.

A tube 18 is threaded on its outside in an opposite hand to that of the outside thread of the tube 16, but fits the inside thread of the said tube. The tube 18 is rigidly attached to the visor section 3, and travels in and out of the tube 16.

By rotating the knob 7, the shaft 5 is rotated which in turn rotates the helical gear 13. This gear in turn rotates the gear 14 in a direction at right angles to its own rotation. The rotation of the gear 14 rotates the shaft 15 to which it is attached. The shaft 15 slides freely in and out of a square hole in the closed end 17 of the tube 16, however, it engages the said tube in rotation due to itself being of a square cross-section.

The rotation of tube 16 causes the tube 18 to travel in and out of the tube 16 thus pulling or pushing the visor sections 2, and 3, and consequently varying the total width of the visor.

The visor can be constructed from various materials, preferably from a light metal which can be finished in the same or matching colors of the car to which it is attached.

Having described the invention, what I claim is:

An adjustable sun visor for cars, comprising a plurality of parallel, overlapping, longitudinal sections which slide in and out to contract or expand the width of the said visor; in combination with manual means for contracting or expanding the width of the said visor consisting of a tube attached to the back of the visor section nearest the car, a shaft passing through the said tube and rotating freely therein, a gear housing attached at each end of said tube, a knob attached to each end of the said shaft, a pair of helical right angle gears rotated by the said knob and shaft, said gears being located within the said housing, and the bottom gear having rigidly attached thereto a shaft of square cross-section; each of said gear casings having a tubular extension therefrom, and a plurality of threaded telescopic tubes moving in and out of the said gear housing extensions, the first of said telescopic tubes having a square hole in the inner end thereof wherein the said square sectioned shaft can slide freely and at the same time engage in rotation the first of the said telescopic tubes, and the last telescopic tube is rigidly attached to the last of the said visor sections.

References Cited in the file of this patent

UNITED STATES PATENTS

| | | |
|---|---|---|
| 1,600,785 | Allen et al. | Sept. 21, 1926 |
| 1,710,449 | Cloud et al. | Apr. 23, 1929 |
| 1,900,337 | Fuchs | Mar. 7, 1933 |
| 1,912,230 | Statz | May 30, 1933 |
| 2,101,901 | Fletcher | Dec. 14, 1937 |
| 2,228,209 | Harrington | Jan. 17, 1941 |
| 2,239,240 | Maguess | Apr. 22, 1941 |
| 2,498,966 | Sauer | Feb. 28, 1950 |
| 2,538,384 | Sauer | Jan. 16, 1951 |
| 2,549,302 | Ferfort | Apr. 17, 1951 |
| 2,674,453 | Hummert | Apr. 6, 1954 |